United States Patent [19]

Dietschi et al.

[11] Patent Number: 5,422,179
[45] Date of Patent: Jun. 6, 1995

[54] POLYMERIC WATERPROOFING MEMBRANES

[75] Inventors: Hans G. K. Dietschi, Sarnen; Jean-Luc C. Schlaepfer, Sachseln; Hanspeter Hunziker, Sarnen, all of Switzerland

[73] Assignee: Sarna Patent- und Lizenz- AG, Switzerland

[21] Appl. No.: 591,227

[22] Filed: Oct. 1, 1990

[30] Foreign Application Priority Data

Oct. 2, 1989 [CH] Switzerland .................. 03567/89

[51] Int. Cl.$^6$ .................................................. C09J 7/02
[52] U.S. Cl. ....................................... 428/349; 428/351; 428/355
[58] Field of Search .................... 428/349, 351, 355

[56] References Cited

U.S. PATENT DOCUMENTS

| | | | |
|---|---|---|---|
| 4,287,034 | 9/1981 | Pieslak | 428/355 |
| 4,424,246 | 1/1984 | Pieslak | 428/343 |
| 4,590,124 | 5/1986 | Schoenberg | 428/349 |
| 4,654,261 | 3/1987 | Takayanagi et al. | 428/336 |
| 4,737,548 | 4/1988 | Kojima | 428/461 |
| 4,827,686 | 5/1989 | Stamper | 52/408 |
| 5,010,119 | 4/1991 | McElrath | 428/407 |

FOREIGN PATENT DOCUMENTS

| | | |
|---|---|---|
| 2156792 | 5/1973 | Germany . |
| 2415850 | 10/1975 | Germany . |
| 3019790A1 | 12/1981 | Germany . |
| 3150021C1 | 4/1983 | Germany . |

OTHER PUBLICATIONS

Encyclopedia of Polymer Science and Engineering, vol. 6, 1986, pp. 522–539.
An "Attachment 2" in chinese language concerning additives.

*Primary Examiner*—Jenna L. Davis
*Attorney, Agent, or Firm*—Burns, Doane, Swecker & Mathis

[57] ABSTRACT

Disclosed is a heat-sealed polymeric waterproofing membranes having an upper layer and a lower layer penetrating an intermediate carrier material. The upper layer and the lower layer comprise a copolymer. The copolymer is the polymerization product of the monomer ethylene and a comonomer selected from the group, of vinylesters of a $C_2$- to $C_3$-alkane carboxylic acids and $C_1$- to $C_4$-alkyl esters of acrylic acid.

These are also described processes for the preparation of the polymeric waterproofing membranes.

The polymeric waterproofing membranes may be used for the sealing of buildings and constructions.

19 Claims, No Drawings

POLYMERIC WATERPROOFING MEMBRANES

FIELD OF THE INVENTION

The present invention is directed to polymeric waterproofing membranes, processes for their preparation and their use for the sealing buildings and constructions.

DESCRIPTION OF THE PRIOR ART

Reviews concerning polymeric waterproofing membranes are contained in the documents "Basisinformation Kunststoffdichtungsbahnen", "Schweizerische Baudokumentation L n 6 01234" of March 1982, CH-4249 Blauen and "Schweizer Baublatt Nr. 45, 5th Jun. 1979/Kunststoffe im Bau Nr. 86".

In DE PS 31 50 021 there are described heat-sealable, multilayer waterproofing membranes of elastomeric plastic materials having an insertion of a reinforcing material. But these flexible waterproofing membranes have being drawback of the black in colour, due to their carbon black content. Thus, when exposed to sunlight, these membranes are warmed whereby the perforation resistance is reduced during installation on roofs.

Other flexible waterproofing membranes of vulcanized elastomer materials have, despite their black colour resulting from their carbon black content, sufficient mechanical stability at elevated temperature, but they are not heat-sealable.

Still other flexible and heat-sealable waterproofing membranes contain plasticizing agents (e.g. soft-PVC-waterproofing membranes) which emigrate or which may be extracted. They show a reduced resistance to aging.

SUMMARY OF THE INVENTION

Hence, it is an object of the present invention to eliminate the above mentioned drawbacks. There is provided a new flexible product, especially effective for use in temperature ranges from −40° C. to +70° C. flexible product having a thickness (strenght) from 0,8 mm to 4 mm, which contains no plasticizing agents or bitumen, and which has good resistance to atmospheric corrosion, resistance to dimension, and processibility, especially heat-sealing, as well as a good chemical, biological and bitumen-resistance. In addition it does not contain any halides or heavy metal stabilizers. Preferably it has a reflecting surface.

The product is composed, prepared and is correspondingly workable such that during application, and thereafter, compared with the prior art, a very good price/result ratio results.

In addition, there is provided simple and cheap processes for the preparation of the product.

According to one aspect of the invention there is provided a heat-sealed polymeric waterproofing membrane comprising an upper layer of at least a copolymer A and a lower layer of at least copolymer A penetrating an intermediate carrier material. The copolymer A is the polymerization product of the monomer ethylene and a comonomer selected from the group of vinylesters of $C_2$- to $C_3$-alkane carboxylic acids and $C_1$- to $C_4$-alkyl esters of acrylic acid.

In another aspect, there is provided a heat-sealed polymeric waterproofing membrane wherein at least one of the upper and lower layers further comprises at least one copolymer B which is the polymerization product of the monomer ethylene and the comonomer propylene, and/or at least one terpolymer which is the polymerization product of the monomer ethylene, the comonomer propylene and at least one diene-monomer, and/or at least one polyolefinic thermoplastic elastomer.

DESCRIPTION OF THE PREFERRED EMBODIMENTS

As noted above, in one aspect of the invention there is provided a heat-sealed polymeric waterproofing membrane comprising an upper layer of at least a copolymer A and a lower layer of at least copolymer A penetrating an intermediate carrier material. The copolymer A is the polymerization product of the monomer ethylene and a comonomer selected from the group of vinylesters of $C_2$- to $C_3$-alkane carboxylic acids and $C_1$- to $C_4$-alkyl esters of acrylic acid.

Preferably, copolymer A is the polymerization product of (i) 70 to 99% by weight of ethylene-monomer, and (ii) 1 to 30% by weight of comonomer, wherein the total of the % by weight is 100. In a more preferred embodiment, copolymer A is the polymerization product of 75 to 88% by weight of ethylene-monomer and 12 to 25% by weight of comonomer.

In another aspect, there is provided a heat-sealed polymeric waterproofing membrane wherein at least one of the upper and lower layers further comprises at least one copolymer B which is the polymerization product of the monomer ethylene and the comonomer propylene, and/or at least one terpolymer which is the polymerization product of the monomer ethylene, the comonomer propylene and at least one diene-monomer, and/or at least one polyolefinic thermoplastic elastomer.

When at least one of the upper and lower layers comprises the terpolymer, it preferably a polymerization product of the monomer ethylene, the comonomer propylene and at least one diene-monomer selected from the group of dicyclopentadiene, 2-ethylidene-norbornene and 1,4-hexadiene. The terpolymer is preferably the polymerization product of (i) 40 to 80% by weight, preferably 65 to 75% by weight, of ethylene-monomer, (ii) 20 to 60% by weight, preferably 20 to 26% by weight, of propylene-comonomer, and (iii) 2 to 12% by weight, preferably 4 to 8% by weight, of diene-monomer, wherein the total of the % by weight is 100.

When at least one of the upper and lower layers comprises a polyolefinic thermoplastic elastomer, a partially cross-linked polyolefinic thermoplastic elastomer is used. In a preferred embodiment, the polyolefinic thermoplastic elastomer has a Shore A hardness in the range from 50 to 80.

Copolymer B can be the polymerization product of (i) 40 to 80% by weight of ethylene-monomer, and (ii) 20 to 60% by weight of propylene-comonomer, wherein the total of the % by weight is 100. Preferably, copolymer B is the polymerization product of (i) 55 to 70% by weight of ethylene-monomer and (ii) 30 to 45% by weight of propylene-comonomer.

In the heat-sealed polymeric waterproofing membrane of the invention, at least one of the upper and lower layers may further include at least one of a pigment such as titanium dioxide or a lightproof pigment, a stabilizer such as a screening agent or an antioxidant, a filler such as chalk, kaolin, talcum, or quartz powder, a processing auxiliary product such as a lubricant or a release agent (e.g., glycerinmonostearate), and an additive which reduces the inflammability of the polymeric waterproofing membrane such as aluminum hydroxide or magnesium hydroxide.

In a particularly preferred embodiment, the heat-sealed polymeric waterproofing membrane comprises (i) 30 to 100% by weight of copolymer(s) A, (ii) up to 40% by weight of at least one of copolymer(s) B, the terpolymer(s) and polyolefinic thermoplastic elastomer(s), (iii) up to 15% by weight of pigment, (iv) up to 5% by weight of stabilizer, (v) up to 25% by weight of filler, (vi) up to 5% by weight of processing auxiliary product, and (vii) up to 60% by weight of additive effective for reducing the inflammability of the polymeric waterproofing membrane, wherein the total of the % by weight is 100.

The carrier material is preferably effective for adding dimensional stability to the polymeric waterproofing membrane during preparation and/or application of the polymeric waterproofing membrane. The carrier material can be a woven fabric, a non-woven fabric, a texture or a fleece, or any combination thereof, made of plastic material fibers and/or glass fibers.

The polymeric waterproofing membranes of the invention provide excellent basic characteristics, due to their composition and the preparation process.

In addition, the invention can provide the following characteristics
  good thermic resistance to aging;
  good resistance to atmospheric corrosion;
  good chemical and biological resistance to aging, especially when in contact with aqueous media, bitumen substances, and microorganisms;
  good flexibility at low temperatures, and insignificant strengthening at low temperatures;
  by glass fleece-insertion an insignificant change in dimension after the storage in heat;
  good composite, and good heat-sealing of the layers;
  no ecological scruples; no halides, no bitumen, no plasticizing agents, no heavy metal stabilizers, no smoke- and/or odor formation during preparation and processing, recyclable, no scruples for the disposal in deposites or by combustions; and
  good workability, especially good heat-sealing for certain the applications with conventional heat-sealing techniques and heat-sealing devices (e.g., hot-air, welding tool, etc.).

Depending on its application, and under depending on preparation costs and selling costs, respectively, it is possible to make a multilayered upper layer. Thus, only the topmost part of the upper layer may be pigmented, with the rest of the upper layer may containing a cheaper filler.

The following example shall illustrate the invention.

The heat-sealed polymeric waterproofing membrane of the invention is particularly effective for sealing at least a portion of a building or construction. For example, the membrane may be used to seal a structure above the surface, an underground structure, an engineered building or construction, a flat or pitched roof either totally or partially exposed to weathering, or a reversal roof or flat roofs covered with humus, a flat roof for foot and/or vehicular traffic, a bridge, gallery, an undercrossing structure, a tunnel, or a dam.

As noted above, the invention also relates to a method for preparing a heat-sealed polymeric waterproofing membrane. In particular, the heat-sealed polymeric waterproofing membrane of the invention is prepared by (i) plastisizing and homogeneously mixing the components for one layer in a first extruder and extruding the mixture through a sheeting die to form a sheet-like mass, then penetrating the mass with an incoming carrier material on one side through a first opening between two calenderings under the influence of pressure. Then (ii) the components for a second layer are plastisized and homogeneously mixed in an extruder and extruded through a sheeting die to form a sheet-like mass. Subsequently, (iii) the material obtained from step (i) is heat-sealed with the material from step (ii) in a second opening between two calenderings under the influence of pressure. In addition, the resulting polymeric waterproofing membrane can be cooled, stamped, backed, cut, and wound.

In one aspect, steps (i) and (ii) of the process are conducted continuously and on-line. Alternatively, the material produced in step (i) is cooled and wound; thereafter, step (ii) is conducted off-line, and then (iii) the material obtained from step (i) is heat-sealed with the material from step (ii) in an opening between two calenderings under the influence of pressure.

EXAMPLE

For the preparation of a 1.8 mm thick polymeric waterproofing membrane having an upper layer and lower layer of the same quality, a premixture was made from the following components in a vertical universal mixer:

| Components | % by weight |
| --- | --- |
| Ethylene-vinylacetate-copolymer with 18% by weight of vinylacetate content | 69.5 |
| Ethylene-propylene-diene-terpolymer with 72% by weight of ethylene 22% by weight of propylene 6% by weight of diene | 23.0 |
| Pigment: titanium dioxide | 2.0 |
| Stabilizers: screening agents/antioxidants | 0.5 |
| Fillers: chalk | 5.0 |

The premixture was plasticized in a synchronized double screw extruder, mixed homogeneously and extruded through a sheeting die (working width 1 m). The material dosage into the extruder was obtained by a differential dosage balance. The temperature of the sheet-like mass, coming out of the sheeting die, was 240° C. to 250° C. The output was 100 kg per hour.

The sheet-like mass was introduced from the top into the lower opening of a calender with 3 calenderings. Simultaneously the carrier material, a glass fleece with a weight per unit area of 50 g/m$^2$, was introduced from below over the lower calendering with a rate of 1.6 m/minute. In order to obtain a complete penetration of the carrier material, it was worked with kneaded stock. The temperature of the lower calendering was 90° C. to 120° C., this one of the calendering in the middle was from 50° C. to 80° C. Through the opening between the lower calendering and the calendering in the middle, the thickness of the membrane was adjusted to 1.0 mm. Then the membrane was cooled to room temperature over cooling calenderings and winded.

In a second step the second layer was inseparably heat-sealed with the membrane, prepared in the first step. The premixing, plasticizing, homogenizing and extruding was carried out in the same manner as described above.

The sheet-like mass, coming out of the sheeting die, was introduced in the lower opening of a calender with 3 calenderings. Simultaneously the membrane from the first step was introduced from below over the lower calendering, whereby the carrier material was turned to the side with the kneaded stock. The temperature of the lower calendering was 30° C. to 50° C., this one of the calendering in the middle was 50° C. to 80° C. Through the opening between the lower calendering and the calendering in the middle, the thickness of the membrane was adjusted to 1.8 mm. Then this membrane was cooled to room temperature over cooling calenderings, the edges were cut, and the membrane was winded.

The so obtained membrane had the following characteristics:

| Test | Standard | Unit | value |
| --- | --- | --- | --- |
| Thickness of the membrane | DIN 53370 | mm | 1.8 |
| Tensile strength | | | |
| lengthwise | DIN 53455 | N/mm$^2$ | 12 |
| crosswise | | | 9 |
| Elongation at break | | | |
| lengthwise | DIN 53455 | % | 450 |
| crosswise | | | 500 |
| Fold bending in the cold | SIA 280/2 | °C. | <−50 |
| Change of shape in the heat | | | |
| lengthwise | SIA 280/3 | % | <0.1 |
| crosswise | | | <0.1 |
| Thermal aging (70 days, 70° C.) | SIA 280/7 | % | −0.05 |
| mass change | | | |
| Behaviour in water | SIA 280/12 | | |
| (after 8 months) | | | |
| intake of water | | % | 0.84 |
| mass change | | % | −0.08. |

While there are shown and described present preferred embodiments of the invention, it is to be distinctly understood, that the invention is not limited thereto, but may be otherwise variously embodied and practiced within the scope of the following claims.

We claim:

1. A heat-sealed polymeric waterproofing membrane containing no halide and no plasticizing agent and having a thickness of about 0.8 to 4 mm and a fold bending strength such that the membrane will not break at a temperature of −40° to 70° C., said membrane comprising an upper layer of at least a copolymer A and a lower layer of at least a copolymer A penetrating an intermediate carrier material, said copolymer A being the polymerization product of the monomer ethylene and a comonomer selected from the group of vinylesters of $C_2$- to $C_3$-alkane carboxylic acids and $C_1$- to $C_4$- alkyl esters of acrylic acid, and in at least one of the upper and lower layers said heat-sealed polymeric waterproofing membrane further comprises at least one copolymer B, said copolymer B being (a) the polymerization product of the monomer ethylene and the comonomer propylene, (b) at least one terpolymer, said terpolymer being the polymerization product of the monomer ethylene, the comonomer propylene and at least one diene-monomer, or (c) mixtures thereof.

2. A heat-sealed polymeric waterproofing membrane according to claim 1, said copolymer A being the polymerization product of (i) 70 to 99% by weight of ethylene-monomer, and (ii) 1 to 30% by weight of comonomer, wherein the total of the % by weight is 100.

3. A heat-sealed polymeric waterproofing membrane according to claim 2, said copolymer A being the polymerization product of 75 to 88% by weight of ethylene-monomer and the comonomer.

4. A heat-sealed polymeric waterproofing membrane according to claim 2, said copolymer A being the polymerization product of the ethylene monomer and 12 to 25% by weight of comonomer.

5. A heat-sealed polymeric waterproofing membrane according to claim 1, wherein at least one of the upper and lower layers comprises said terpolymer, said terpolymer being the polymerization product of the monomer ethylene, the comonomer propylene and at least one diene-monomer selected from the group of dicyclopentadiene, 2-ethylidene-norbornene and 1,4-hexadiene.

6. A heat-sealed polymeric waterproofing membrane according to claim 1, wherein at least one of the upper and lower layers comprises copolymer B, said copolymer B being the polymerization product of (i) 40 to 80% by weight of ethylene-monomer, and (ii) 20 to 60% by weight of propylene-comonomer, wherein the total of the % by weight is 100.

7. A heat-sealed polymeric waterproofing membrane according to claim 6, said copolymer B being the polymerization product of (i) 55 to 70% by weight of ethylene-monomer and (ii) 30 to 45% by weight of propylene-comonomer.

8. A heat-sealed polymeric waterproofing membrane according to claim 1, wherein at least one of the upper and lower layers comprises said terpolymer said terpolymer being the polymerization product of (i) 40 to 80% by weight of ethylene-monomer, (ii) 20 to 60% by weight of propylene-comonomer, and (iii) 2 to 12% by weight of diene-monomer, wherein the total of the % by weight is 100.

9. A heat-sealed polymeric waterproofing membrane according to claim 8, said terpolymer being the polymerization product of (i) 65 to 75% by weight of ethylene-monomer (ii) 20 to 26% by weight of propylene-comonomer and (iii) 4 to 8% by weight of diene-monomer.

10. A heat-sealed polymeric waterproofing membrane according to claim 1, comprising (i) at least 30% by weight of copolymer(s) A, (ii) up to 40% by weight of at least one of copolymer(s) B, (iii) up to 15% by weight of pigment, (iv) up to 5% by weight of stabilizer, (v) up to 25% by weight of filler, (vi) up to 5% by weight of processing auxiliary agent, and (vii) up to 60% by weight of additive effective for reducing the inflammability of the polymeric waterproofing membrane, wherein the total of the % by weight is 100.

11. A heat-sealed polymeric waterproofing membrane according to claim 1, wherein at least one of the upper and lower layers further comprises at least one of a pigment, a stabilizer, a filler, a processing auxiliary agent, and an additive which reduces the inflammability of the polymeric waterproofing membrane.

12. A heat-sealed polymeric waterproofing membrane according to claim 11, wherein at least one of the upper and lower layers comprises at least one of titanium dioxide, and a lightproof pigment.

13. A heat-sealed polymeric waterproofing membrane according to claim 11, wherein at least one of the upper and lower layers comprises at least one of a screening agent and an antioxidant.

14. A heat-sealed polymeric waterproofing membrane according to claim 11, wherein at least one of the upper and lower layers comprises at least one of chalk, kaolin, talcum, quartz powder.

15. A heat-sealed polymeric waterproofing membrane according to claim 11, wherein at least one of the upper and lower layers comprises at least one of a lubricant, a release agent, and glycerinmonostearate.

16. A heat-sealed polymeric waterproofing membrane according to claim 11, wherein at least one of the upper and lower layers comprises at least one of aluminum hydroxide and magnesium hydroxide.

17. A heat-sealed polymeric waterproofing membrane according to claim 1, wherein said carrier material is effective for adding dimensional stability to the polymeric waterproofing membrane during preparation and/or application of the polymeric waterproofing membrane.

18. A heat-sealed polymeric waterproofing membrane according to claim 17, said carrier material being a woven fabric, a non-woven fabric, a texture or a fleece, or any combination thereof, made of plastic material fibers and/or glass fibers.

19. A heat-sealed polymeric waterproofing membrane containing no halide, no plasticizing agent, and no bitumen and having a thickness of about 0.8 to 4 mm and a fold bending strength such that the membrane will not break at a temperature of −40° to 70° C., said membrane comprising an upper layer of at least a copolymer A and a lower layer of at least a copolymer A penetrating an intermediate carrier material, said copolymer A being the polymerization product of the monomer ethylene and a comonomer selected from the group of vinylesters of $C_2$- to $C_3$-alkane carboxylic acids and $C_1$- to $C_4$-alkyl esters of acrylic acid, and in at least one of the upper and lower layers said heat-sealed polymeric waterproofing membrane further comprises at least one copolymer B, said copolymer B being (a) the polymerization product of the monomer ethylene and the comonomer propylene, (b) at least one terpolymer, said terpolymer being the polymerization product of the monomer ethylene, the comonomer propylene and at least one diene-monomer, or (c) mixtures thereof.

* * * * *